(12) United States Patent
Thieret et al.

(10) Patent No.: US 7,120,283 B2
(45) Date of Patent: Oct. 10, 2006

(54) METHODS AND APPARATUS FOR BACK-PROJECTION AND FORWARD-PROJECTION

(75) Inventors: Scott A. Thieret, Nashua, NH (US); Valeri Kotlov, Woburn, MA (US); Joseph Goddard, Salem, MA (US); Ari P. Berman, Lexington, MA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 0 days.

(21) Appl. No.: 10/756,172

(22) Filed: Jan. 12, 2004

(65) Prior Publication Data

US 2005/0152590 A1 Jul. 14, 2005

(51) Int. Cl.
*G06K 9/00* (2006.01)

(52) U.S. Cl. ............ 382/131; 382/132; 382/285; 382/293; 378/4; 378/21; 128/922

(58) Field of Classification Search ........ 382/131, 382/128, 132, 285, 293; 128/922; 378/4, 378/10, 21, 23
See application file for complete search history.

(56) References Cited

U.S. PATENT DOCUMENTS

| | | | | |
|---|---|---|---|---|
| 5,412,764 | A | * | 5/1995 | Tanaka ............... 345/424 |
| 5,633,951 | A | * | 5/1997 | Moshfeghi ........... 382/154 |
| 6,268,846 | B1 | * | 7/2001 | Georgiev ............. 345/419 |
| 6,289,235 | B1 | * | 9/2001 | Webber et al. ....... 600/426 |

(Continued)

OTHER PUBLICATIONS

Selldin, Feb. 20, 2002, "Design and implementation of an application programming interface for volume rendering" (pp. 1-21).*

(Continued)

Primary Examiner—Kanjibhai Patel
Assistant Examiner—Manav Seth
(74) Attorney, Agent, or Firm—David J. Powsner; Nutter McClennen & Fish LLP (57) ABSTRACT

The invention provides improvements in reconstructive imaging of the type in which a volume is reconstructed from a series of measured projection images (or other two-dimensional representations) generated by projection of a point x-ray source (or other radiation source), positioned at a distinct focus, through the volume to a plane at which the respective projection image is acquired ("detector plane"). In one aspect, the improvements are with respect to back-projecting a two-dimensional representation lying in the detector plane (representing, for example, a difference between an originally-acquired measured projection image and a subsequently-generated estimate thereof) to generate three-dimensional representation (which can be used, for example, to update an estimate of the volume). According to this aspect, for each of one or more slices of the 3D representation parallel to the projection plane and for each distinct focus at which a projection is generated, the following steps are performed in connection with the back-projection: (i) warping the first 2D representation to generate a second 2D representation by applying to the first 2D representation a selected linear mapping, where that selected linear mapping would map, in order to match dimensions of the respective slice within the 3D representation, a region defined by projection, at the respective focus, of corners of that slice onto the detector plane, and (ii) incrementing values of each of one or more voxels of the respective slice by an amount that is a function of a value of a correspondingly indexed pixel of the second 2D representation. A related aspect provides improvements with respect to forward-projecting, as well as in iterative (and non-iterative) methodologies that incorporate both back-projection and forward-projection.

25 Claims, 5 Drawing Sheets

U.S. PATENT DOCUMENTS

2004/0125103 A1* 7/2004 Kaufman et al. ........... 345/419

OTHER PUBLICATIONS

Jain, Jun. 18, 2001, "A programmable graphics chip". (pp. 1-5).*

McCool, August 1, 2000, "SMASH: A nextgeneration API for programmable graphics accelerators". (pp. 1-32).*

Wu et al., "Tomographic Mammography Using A Limited Number of Low-dose Conebeam Projection Images," Med. Phys., pp. 365-380. (2003).

Lange et al., "EM Reconstruction Algorithms For Emmission And Transmission Tomography," J. Computer Assisted Tomography 8, pp. 306, et seq. (1984).

Li et al., "Tomographic Optical Breast Imaging Guided by Three-Dimensional Mammography," Applied Optics, Sep. 1, 2003, vol. 42, No. 25, pp. 5181-5190.

Lange et al. "Globally Convergent Algorithms for Maximum a Posteriori Transmission Tomography," IEEE Transactions on Image Processing, Vo. 4, No. 10, Oct. 1995.

Dobbins et al., "Digital X-Ray Tomosynthesis: Current Starte of the Art and Clinical Potential," Physics in Medicine and Biology, vol. 48, pp.R65-R106. (2003).

Dachille, et al., "High-Quality Volume Rendering Using Texture Mapping Hardware", Siggraph/Eurographics Hardware Workshop, 1998. (8 pages).

* cited by examiner

METHODS AND APPARATUS FOR BACK-PROJECTION AND FORWARD-PROJECTION

BACKGROUND OF THE INVENTION

The invention relates to digital data processing and, particularly, to novel methods and apparatus for forward-projection and back-projection for use, e.g., in reconstructive imaging. The invention has application in health care and, specifically, medical imaging—as well as in a host of other areas, such as manufacturing, security, research, and defense.

A forward-projection is an operation for estimating the (two-dimensional) transmission or emission shadow that would result from illumination of a (three-dimensional) object by a point source which emits radiation that partially passes through the object. By way of example, a forward-projection could be performed in order to provide an estimate of what an x-ray image of a human might look like. The term forward-projection also refers to the estimate that is determined from executing a forward-projection operation.

A back-projection is an operation for generating a simple estimate of the structure of a (three-dimensional) object that could produce a given (two-dimensional) transmission or emission shadow, if that object was illuminated by a point source which emits radiation that at least partially passes through the object. To continue the example, a back-projection could be performed in order to generate a simple estimate of the body structures the imaging of which resulted in a particular x-ray image. As above, the term back-projection also refers to the estimate that is determined from executing such a back-projection operation.

Reconstructive imaging is a procedure for constructing a three dimensional (3D) model of a subject from a series of two-dimensional (2D) projection images. These projection images are typically generated by exposing the subject to a x-ray (or other radiation) point source that is positioned on one side of the subject and measuring the transmitted (or non-absorbed) radiation with a 2D detector that is positioned on the opposite side of the subject. A series of these projections is created by repeatedly measuring the transmitted radiation as the point source and/or the detector are moved differing locations relative to the subject.

For example, computed axial tomography (CAT) is a reconstructive imaging technique in which a three-dimensional model of the internals of an object—typically, some portion of the human body—is constructed from a series of two-dimensional x-ray projections taken at evenly spaced angles that surround the object. With the aid of a computer, the series of acquired 2D projection images are computationally projected backwards to estimate the relative density of the internal structures of the object (e.g., in the case of a head, the skull, gray matter and other resolvable structures). While no one of these back-projections is, by itself, sufficient to identify those structures, the computational combination of all of the back-projections typically produces a reasonable 3D representation of the object. Because this typically involves performing back-projections on hundreds, if not thousands, of projected images, reconstruction systems typically incorporate special-purpose hardware in order to provide timely results. Though prior art solutions have proven effective in this regard, they are typically quite expensive.

Moreover, those prior art solutions for determining back-projections have limited applicability to a new class of imaging, referred to as tomosynthesis, in which a relatively small number of projection images are acquired from only a limited number of x-ray source positions (or foci). Typically, these foci are distributed across a limited arc. For this type of imaging, the requisite reconstruction requires an iterative approach. In these systems, the computations include not only back-projections, but also forward-projections, in which estimates of the volume being reconstructed are projected "forward" to generate hypothetical projection images for computational comparison with actual measured projection images acquired by the imaging equipment. By comparing the hypothetical forward projection of the current 3D model to the measured projection images, a correction image can be calculated and used to update (modify) the current 3D model.

CAT scanners and tomosynthesis systems are not the only medical imaging equipment that use forward-projections and/or back-projections. Forward-projection and back-projection operations also form the basis of a broader class of computer-based imaging techniques, referred to as computed tomography (CT), as well positron emission tomography (PET), single photon emission computed tomography (SPECT), to name but a few. In addition, back-projection and forward-projection are used outside the medical field, for example, in manufacturing (e.g., to inspect articles for defects), security (such as baggage scanning) in research, defense and so forth.

An object of the invention is to provide improved digital data processing apparatus and methods. Another object is to provide such apparatus and methods as can be applied in reconstructive imaging applications, e.g., of the types referred to above (by way of non-limiting example).

Related objects of the invention are to provide such apparatus and methods as can be performed more rapidly and with fewer computational resources. A related object of the invention is to provide such methods and apparatus as can be performed with less expensive equipment, off-the-shelf or otherwise.

SUMMARY

The above objects are among those attained by the invention, which provides improvements in reconstructive imaging. In one aspect, those improvements pertain to generating a back-projection of a measured projection image (or other 2D representation) to create an estimate of a 3D volume. Such back-projection can be applied in connection with conventional reconstructive imaging, as well as in connection with iterative reconstruction techniques of the type used in tomosynthesis.

In both applications, as well as any others in which such back-projection might be applied, aspects of the invention provide for creating each plane of the reconstructed volume by performing a geometric warp of the projection data.

According to some aspects of the invention, e.g., those for use in connection with computed tomography systems where only the x-ray source moves relative to the subject and the detector position remains fixed relative to the subject, the reconstruction volume is positioned such that each plane of the volume is parallel to, and aligned with, the plane of the detector. Related aspects of the invention employ a geometric warp that is a first order function separable in the x-axis and y-axis, e.g., capitalizing on the reduced complexity of the geometry resulting from such parallel alignment. This makes the computation simpler for both general-purpose computers as well as graphic processing units (GPUs). In further related aspects of the invention, such a first order warp is performed by mapping the projection point of the four corners of the detector plane (or "projection plane") into a specific plane of the reconstruction volume. When a back-projection according to the invention is applied (by way of example) to a computed tomosynthesis application where the detector remains stationary (relative to the subject), these four points define a rectangle aligned to the axis of the detector. In this and other such applications with such a resulting alignment, aspects of the invention call for generating the step function of the resampling function (i.e., the warp) as the ratio of length of the rectangle (on each the x-axis and the y-axis) and the corresponding length of the detector (in the same axis).

Other aspects of the invention likewise provide for using a set of complimentary warps to perform the back-projection, even where the projections are produced by non-aligned detectors. In these cases, the warp can be referred to as a perspective warp and is computationally more expensive.

A related aspect of the invention provides improvements with respect to calculating the forward-projection of a 3D volume. In this case a 3D model (for example, an estimate of the volume being reconstructed) produces a 2D projection lying in the detector plane. This projection may represent an estimate of a projection originally acquired at that focus. According to this aspect, for each slice in the 3D representation parallel to the detector plane, the following steps are performed in connection with the forward projection: (i) warping the respective slice of the 3D representation to generate a respective slice of second 3D representation by applying to the former (i.e., the slice of the first 3D representation) a selected linear mapping, where that selected linear mapping would map a region defined by projection of corners of the respective projection onto the respective slice of the first 3D representation for the respective focus to match dimensions of the projection in the detector plane, and (ii) incrementing values of each of one or more pixels of the 2D representation by an amount that is a function of a value of a correspondingly indexed pixel of the respective slice of the second 3D representation.

Further related aspects of the invention provide methods as described above in which at least the warping steps are executed on graphics processing unit (GPU) coprocessor, e.g., of the type having programmable pixel and vertex shaders. In instances where the GPU provides an add instruction (or related arithmetic instructions) that provide for parallel processing of multi-component operands, further related aspects of the invention contemplate executing such an instruction with a lower-order portion of a mantissa in one component of an operand and a higher-order portion of that mantissa in another component of that same operand. Carry-over (from the lower-order to higher-order portions) and/or recombination of the mantissa portions can be performed subsequently.

Further aspects of the invention provide improved methods as discussed above for use in medical imaging. According to these aspects, both the forward-projecting and the back-projecting innovations can be used as part of a maximum likelihood estimation maximization (MLEM) or in other iterative techniques.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

The invention provides improved methodologies and apparatus for forward-projection and back-projection that reduce the time and processing power required to reconstruct three-dimensional volumetric representations, e.g., from a series of two-dimensional measured projection images.

The invention has application, for example, in medical imaging and the embodiment described below is one such application: a tomosynthesis mammography system, which is based on maximum likelihood estimation maximization (MLEM) algorithm. It will be appreciated that the improved forward-projection and back-projection methodologies and apparatus described herein have application in computed tomography (CT), positron emission tomography (PET), single photon emission computed tomography (SPECT), and other medical imaging applications, as well as in reconstruction applications outside the medical realm, whether based on MLEM or otherwise.

Figure 1:
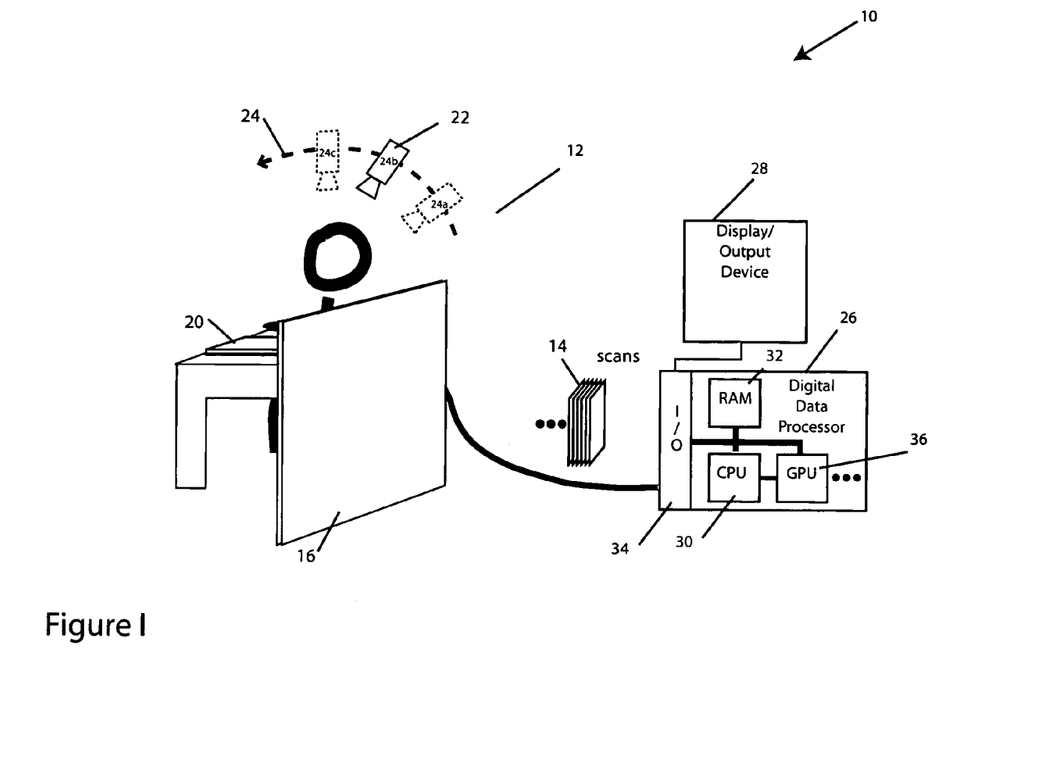
FIG. 1 depicts a mammography system according to one practice of the invention.

Turning to the illustrated embodiment, FIG. 1 depicts a mammography system 10 according to one practice of the invention. The system includes a conventional image acquisition apparatus 12 that generates projection images 14 of the breast of a patient, depicted here partially obscured behind privacy partition 16. The projections are produced by illuminating the breast with a radiation source 22 and detected by a charge-coupled device or other 2D sensor array 20, emissions not absorbed by the breast. Multiple projections are required for adequate reconstruction of a three-dimensional representation of the breast. In one embodiment, those projections are generated in accord with the principles of computed tomography (CT), i.e., with the source 22 at discrete foci on an arc 24 that completely, or more completely, surrounds the breast. In another embodiment, those projections are generated in accord with the principles of computed tomosynthesis, i.e., with the source 22 at discrete foci along a smaller arc above the breast. Regardless, in the drawing, only three exemplary foci are shown, labeled 24a–24c, though in actual implementation many more foci would likely be used.

In the illustrated embodiment, the image acquisition apparatus 12 comprises an x-ray source and 2D sensor of the type provided, for example, in a digital mammography system of the type available in the marketplace. Of course, the apparatus 12 may instead comprise an analog mammography system, a CT system or other imaging system, e.g., so long as the measured projection images produced thereby are digitized or are otherwise amenable for processing in accord with the teachings hereof.

Digital data processor 26 analyzes the two-dimensional projections 14 generated by apparatus 12 to reconstruct a three-dimensional volumetric image of the breast. That processor 26 may form part of a workstation that performs additional functions (such as controlling acquisition apparatus 12, storing patient data, generating user interfaces, or otherwise) or it may be a stand-alone or embedded processor that works within, or alongside, such a workstation (or other computing device) to perform such analysis.

As shown in the drawing, the digital data processor includes a central processing unit (CPU) 30, dynamic memory (RAM) 32, and I/O section 34, all of the type conventionally known the art. The digital data processor 26 may be coupled, via I/O section 34, with acquisition device 12, as well as with a monitor or other presentation device 28 on which the three-dimensional reconstruction is displayed.

Illustrated digital data processor 26 also includes a graphical processing unit 36 that is coupled to the CPU 30, through which it can access the other elements of the digital data processor 26, as shown. The GPU 36 serves, in the illustrated embodiment, as a coprocessor, operating under the control of the CPU 30 to generate front- and back-projections from the projection images 14 in accord with the teachings hereof. Other embodiments of the invention employ multiple GPUs for this purpose, each responsible for a respective portion of the reconstruction processing. Still other embodiments use no GPU at all, relying on the CPU 30 and/or other co-processing functionality (such as floating point units, array processors, and so forth) to provide or supplement such reconstruction processing, all in accord with the teachings hereof. In embodiments which use GPUs, preferred such devices are of the variety having programmable vertex shaders and programmable pixel shaders and are commercially available from ATI Research (for example, the Radeon™ 9700 processor), NVIDIA (for example, the GeForce™ FX and Quadro® processors).

Figure 2:
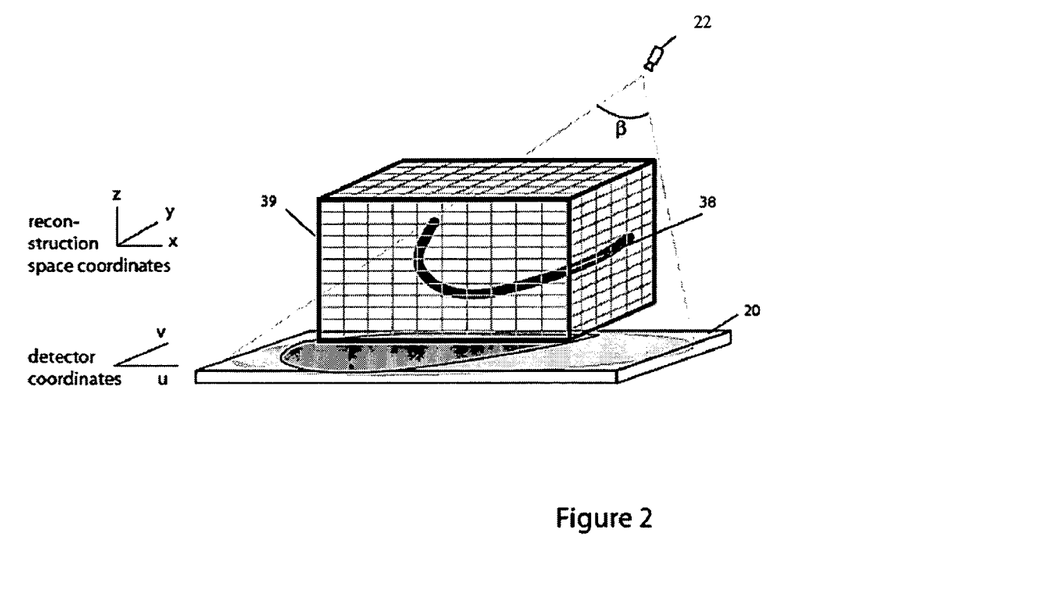
FIG. 2 depicts generation of a measured projection image in a mammography system of the type show in FIG. 1.

FIG. 2 depicts generation of a measured projection image by apparatus 12 when the source 22 is positioned at one focus (e.g., of a computed tomography apparatus, a computed tomosynthesis apparatus, or otherwise). X-rays emitted by the source travel through the imaged volume 39 and impinge on the sensor array 20 in a cone beam. A cone beam is defined as a collection of rays that diverged from a local point source. Those rays are detected by cells in the 2D sensor array 20 and output, typically, as pixels whose values correspond to the incident ray intensity. Rays passing through tissue in the breast are absorbed to an extent that depends on the volume and relative density of the intervening tissue. This results in transmission or emission shadow 38 of varied intensity at the sensor array 20. This transmission or emission shadow is a classic 2D x-ray image. It is that intensity variation, recorded in the pixel values of the 2D sensor array 20 for taken at each x-ray source focus, which is analyzed by digital data processor 26 to reconstruct the imaged volume 39, which is drawn here with its constituent volumetric elements, or voxels.

Systems according to the invention utilize digital data processor 26 to perform that reconstruction using improved back-projections and/or forward-projections in which projection operations are performed as if rays of the source 22 had passed through the imaged volume and impinged on the sensor array—not as a divergent cone beam—but, rather, at a constant angle relative to the plane of the sensor array (i.e., the "detector plane"). Put another way, those operations are performed as if the rays had traveled along parallel paths through the volume and to the detector plane, e.g., as if emitted by a point source disposed infinitely far from the sensor. Those projection operations are executed, in the illustrated embodiment, by mapping and re-mapping coordinates of voxels and pixels (in the space defined by volume 39 and region defined by sensor array 20, respectively) prior to processing-intensive phases (i.e., so-called "inner loops") of the reconstruction. The projection operations are preferably performed using a GPU (or GPUs) of the type referred to above, which can perform the mapping and re-mapping operations at maximal speed and with minimal code by executing first-order "warping" operations.

Figure 3:
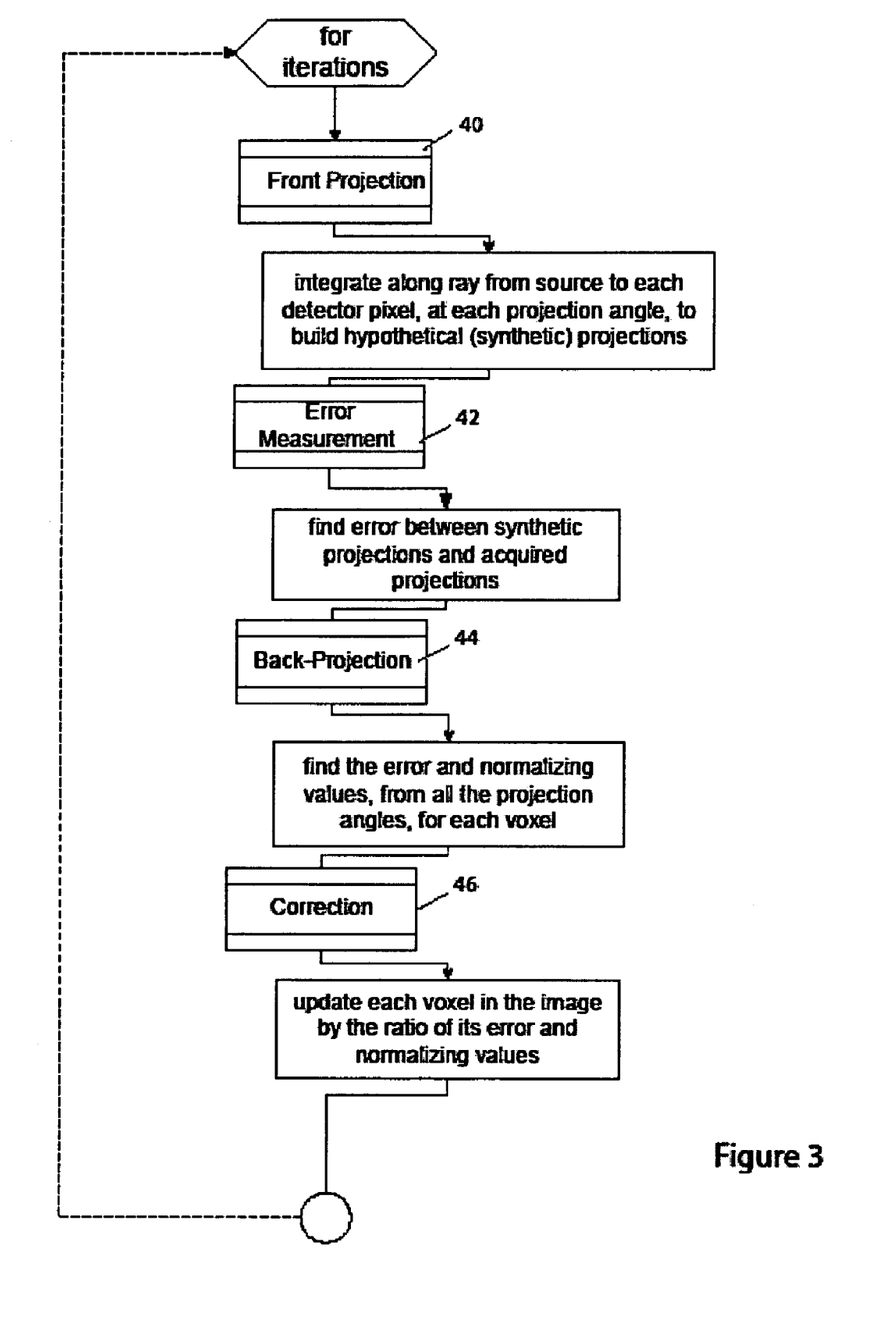
FIG. 3 depicts basic steps of an maximum likelihood estimation maximization (MLEM) reconstruction.

In the illustrated embodiment, the improved methodologies and apparatus for back-projection and forward-projection are used with an MLEM reconstruction technique; although, in other embodiments, those improved methodologies and apparatus are utilized in connection with other iterative techniques, such as the so-called Algebraic Reconstruction Technique, or non-iterative techniques. The basic steps of that MLEM reconstruction are shown in FIG. 3. There, MLEM reconstruction is shown to be an iterative process involving successive stages of forward-projection (or re-projection), error-measurement, back-projection and correction. With each iteration, absorption estimates for the volume 39 converge toward a suitable representation of the imaged breast—typically, within ten to twenty iterations, though, this depends on the number of measured projection images 14, the resolution of the imaging apparatus, and the specifics of the MLEM algorithm employed.

With specific reference to FIG. 3, each iteration begins with a forward-projection (or re-projection); see, step 40. Here, absorption estimates for the volume 39 are stored in a matrix estimated volume, though other data structures or storage formats known in the art can be used instead. Those estimates are integrated along each x-ray path that extends from the source 22 to each sensor pixel. This is done for each source 22 focus and results in a set of hypothetical (or synthetic) projection images that geometrically correspond to the original set of measured projection images generated by the apparatus 12. According to the prior art, the x-ray paths are treated as diverging from a local point source. However, in the illustrated embodiment (as further discussed below), the paths are treated as if parallel to one another relative to the sensor's detector plane, as if the point source 22 were infinitely far from the sensor. Prior to the first iteration, the estimated volume is initialized with an average expected absorption constant or any other default value (or set of values).

In step 42, those hypothetical reconstructed projection images are compared with the measured projection images generated by the image acquisition apparatus. For each x-ray source focus, an array (or other data structure or storage format) difference is generated representing pixel-by-pixel differences between intensities in the measured projection images and current hypothetical projection images for the current x-ray source focus. In embodiments that utilize a Poisson noise-based weighting in the correction-phase (step 46), an array (or other data structure or storage format) reference can also be also be generated in step 42 representing the minimum expected error assuming Poisson noise in the original projection images. The difference array—and, where used, the reference array—have the same dimensions as the measured and hypothetical projection images and, thus, are suitable for back-projection into "correction" volumes having the same dimensions as the estimated volume.

(A discussion of the aforementioned Poisson noise-based weighting is provided in Wu et al, "Tomographic Mammography Using A Limited Number Of Low-dose Conebeam Projection Images," Med. Phys., pp. 365, et seq. (2003) (and, specifically, the discussion of the use of such weighting at p. 371) and Lange et al, "EM Reconstruction Algorithms For Emission And Transmission Tomography," J. Comput. Assist. Tomogr. 8, pp. 306, et seq. (1984), the teachings of both of are incorporated herein by reference.)

In step 44, a first correction volume is generated by back-projection of the difference array over all x-ray source foci. A second such volume can also be generated, in embodiments that utilize the aforementioned Poisson noise-based weighting, by back-projection of the reference array over those same x-ray source foci. As above, whereas according to the prior art, these back-projections are performed along x-ray paths that diverged from a local point source, in the illustrated embodiment (as further discussed below) the paths are assumed parallel to one another relative to the sensor's detector plane—again, as if the source 22 were infinitely far from the sensor.

In step 46, the absorption estimates in the voxels of the estimated volume are updated or corrected. In some embodiments, the value of each voxel of the current estimate matrix is reduced (or increased) by the value of the corresponding voxel of the first correction volume. In embodiments that utilize the aforementioned Poisson noise-based weighting, the reduction (or increase) is by the ratio of the values in the corresponding voxels of the difference and reference arrays.

Steps 40–46 are repeated the absorption values in the estimated volume matrix converge to close approximation of the actual object, again, typically, within ten to twenty iterations, depending on the number of projection images 14, the resolution of the imaging apparatus, and the specifics of the MLEM (or other) reconstruction algorithm employed. It should be noted that even after the algorithm stops converging the estimated volume matrix will retain some error terms, and that these error terms will continue to be redistributed throughout the volume between subsequent iterations of the algorithm.

As noted above, in prior art, forward projection and back-projection are performed along x-ray paths, that diverge from a local point source 22 as they head toward the different detector elements of the 2D sensor array 20. A problem with this is that it complicates the inner loop of each of these projections. For forward-projections, for example, it requires calculation of the intersection of each estimated ray with each voxel along the ray's path in order to determine how much that voxel's estimated absorption decreases the ray intensity. It also requires an additional steps, within the inner loop, to determine neighboring voxel's contributions to absorption (this is particularly true in instances where the volume 39 is defined with voxels that are "taller" (in the z-dimension) than they are wide and/or deep (in the x- or y-dimensions). Similar problems are encountered in back-projections according to the prior art.

Figure 4:
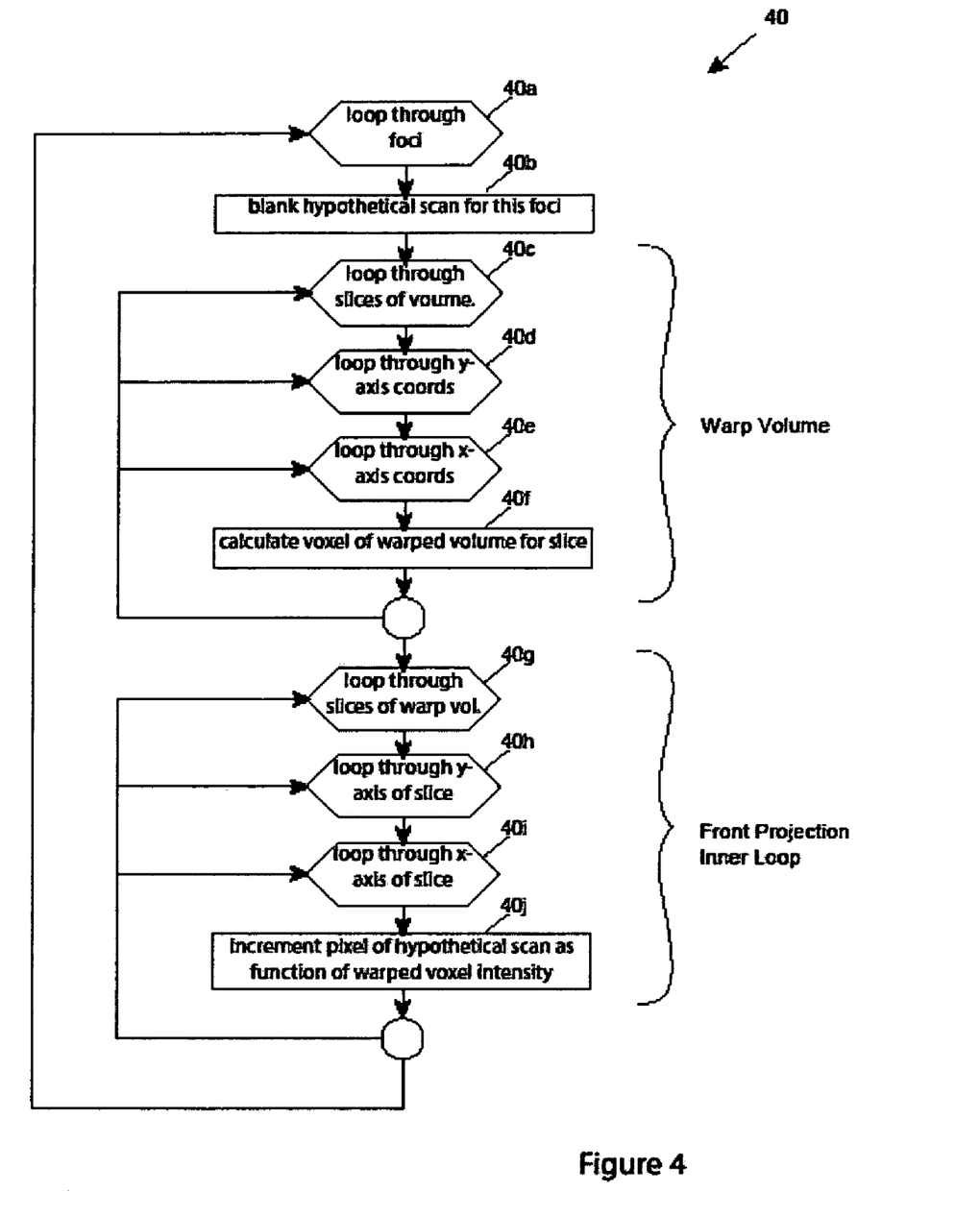
FIG. 4 depicts steps performed in a forward-projection operation according to one practice of the invention.

The illustrated embodiment overcomes this by performing forward-projection (step 40) in the manner illustrated in FIG. 4.

In step 40a, the digital data processor 26 begins a loop through the foci 24a–24c. In step 40b, the estimated projection image for the current focus is zeroed.

In steps 40c–40f, the digital data processor 26 loops through the slices (i.e., z-axis indices) of the estimated volume array and generates corresponding slices in an array (or other data structure) warped volume. This is done by a first-order warp which linearly maps the voxels of each slice of the former (estimated volume) to the voxels of the latter (warped volume).

The result of the processing effected in steps 40c–40f is to produce a volume of absorption estimates warped as if rays of the source 22 had passed through the imaged volume 39—not as a diverged cone beam—but, rather, at a constant angle relative to the plane of the 2D sensor array 20, or detector plane. Put another way, the effect is as if the rays had traveled along parallel paths, e.g., as if emitted by a point source disposed infinitely far from the sensor.

Once this is accomplished, the inner loop of the forward-projection can be executed as shown in steps 40g–40j. Particularly, the value of each pixel in the hypothetical projection can be determined by summing absorption constants of correspondingly indexed voxels in the respective slices of the warped volume array. Though not shown in the flow chart, each such sum is preferably weighted by a factor dependent on the radial distance of the hypothetical projection pixel from a point of intersection of a normal extending from the surface of the sensor array 20 to the focus for which that projection is being generated. In one embodiment, that weighting decreases from one (for pixels at that point of intersection)=L/L (where L=length of the x-ray source normal from x-ray source to the detector plan) to $SQRT(L^2 + dx^2 + dy^2)/L$ (where dx and dy are the offsets from the intersection of the x-ray normal to the indicated pixel in the detector), though, in other embodiments, this may vary.

Pseudocode corresponding to the forward-projection steps 40a–40j is reprinted below:

```
for focus = 1 to (n)
    # start with blank estimated projection images
    for u = 1 to x(max)
        for v = 1 to y(max)
            estimated projection(foci,u,v) = 0
    # warp volume as if illuminated by a point source at
    # infinity (i.e., parallel rays)
    for k = 1 to z(max)
        for u = 1 to x(max)
            for v = 1 to y(max)
                warped_volume(u,v,k) = warp1(estimated_volume,u,v,k,
                                             location(sensor),foci)
# perform forward-projection (re-projection)
# using warped volume
for k = 1 to z(max)
    for u = 1 to x(max)
        or v = 1 to y(max)
            estimated projection(foci,u,v) = estimated projection(foci,u,v)
                                             + warped_volume(u,v,k)
```

In this example, the function warp1( ) is the aforementioned first-order warp. It linearly maps a voxel at coordinates (u,v,k) of the current slice, k, of the estimated volume array to a voxel that lies within a volume defined by a projection, at the angle of the current focus, of the corners of the sensor array 20 onto the volumetric plane of that slice. Put another way, the function can be considered as projecting the corners of the sensor array 20 onto the plane of the current slice k of the estimated volume matrix, given the current focus, and as linearly mapping voxels of that projection (which can be thought of as a "shadow" of the sensor)—including those of the current slice of estimated volume that fall within that "shadow"—so that they match the dimensions of the sensor in the original sensor plane.

Figure 5:
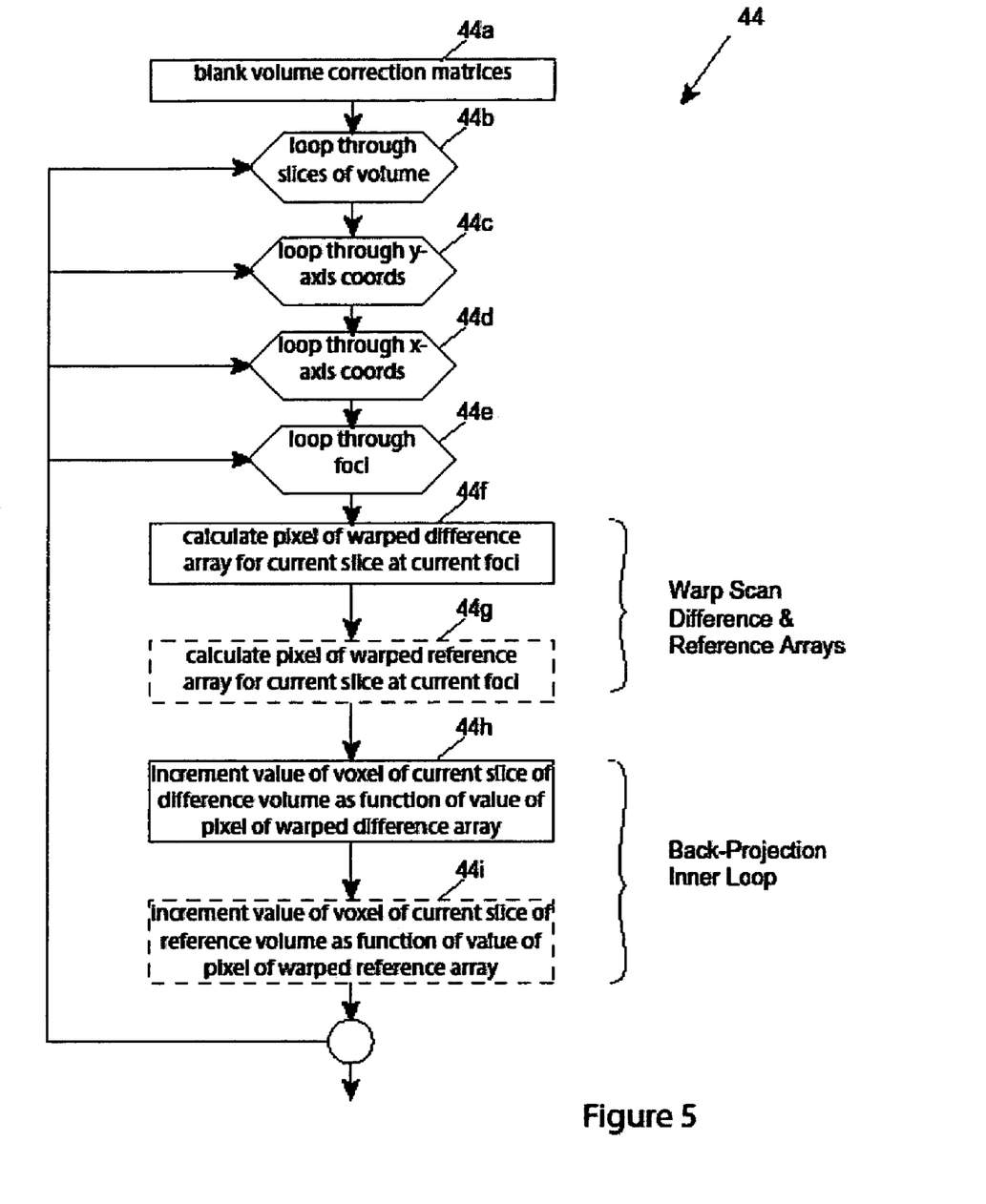
FIG. 5 depicts steps performed in a back-projection operation according to one practice of the invention.

The illustrated embodiment overcomes the deficiencies of prior art back-projection (step 44) by executing that operation the manner illustrated in FIG. 5. In step 44a, the digital data processor 26 zeros the volume correction matrices into which the difference and reference arrays will be back-projected and which, in step 46, will be used to correct the estimated volume matrix. Step 44b is the start of a loop through individual slices of the volume, while steps 44c–44d begin loops through the individual voxels of that slice. In steps 44e–44g, the digital data processor loops through the foci 24a–24c and calculates, for each, a pixel of a warped difference array for the current slice and focus, and a pixel of a warped reference array, again, for the current slice and focus.

The warped difference array is generated from corresponding pixels of the difference array generated in step 42. This is done by a first-order warp which linearly maps the pixels of the difference array.

In embodiments which utilize a second volume correction matrix in the correction step 46, the digital data processor generates a warped reference array in step 46g. This is accomplished in the same manner as the warped difference array.

The result of the processing effected in steps 44f–44g is to produce an array of intensity differences (and, where applicable, an array of reference intensity values) warped as if rays of the source 22 had passed through the imaged volume 39—not as a collection of rays that diverged from a local point source—but, rather, at a constant angle relative to the plane of the sensors detector plane 20. Put another way, the effect is as if the rays had traveled along parallel paths, e.g., as if emitted by a point source disposed infinitely far from the sensor.

Once this is accomplished, the inner loop of the back-projection can be executed as shown in steps 44h–44i. Particularly, the value of each voxel of the current slice of the first volume correction matrix is determined by summing intensities from correspondingly indexed pixel values of the warped difference array. And, likewise, in embodiments that utilize a second volume correction matrix, the value of each voxel in the current slice of that matrix is determined by summing intensities from correspondingly indexed pixel values of the warped reference array.

Pseudocode corresponding to the back-projection steps 44a–44i is reprinted below:

```
# start with blank volume correction matrices
for i = 1 to x(max)
    for j = 1 to y(max)
        for k = 1 to z(max)
            a(i,j,k) = 0
            b(i,j,k) = 0
# back-projection loop
for k = 1 to z(max)
    for j = 1 to y(max)
        for i = 1 to x(max)
            for focus = 1 to (n)
                #  warp difference and reference arrays as if
                #  illuminated by a point source at infinity
                #  (i.e., parallel rays)
                warped_difference(i,j,k) = warp2(difference,i,j,
                                k,location(sensor),foci)
                warped_reference(i,j,k) = warp2(reference,i,j,k,
                                location(sensor),foci)
                # back project error terms into volume correction
                # matrices a & b
                a(i,j,k) = a(i,j,k) + warped_difference(foci,i,j)
                b(i,j,k) = b(i,j,k) + warped_reference(foci,i,j)
```

In this example, the function warp2( ) linearly maps the pixels of the difference array (and reference array) to pixels of the warped difference array (and warped reference array). This is effectively the complement to warp1( ), discussed above, and hence might be thought of as an "unwarp." It linearly maps pixels at coordinates (i, j) for the current focus of the difference array to a pixel that lies within a region defined by a projection, at the angle of the current focus, of the corners of the current slice k of the estimated volume onto the plane of the sensor array 20. Put another way, the function can be considered as projecting the corners of the current slice of the estimated volume onto the plane of the sensor array 20, given the current focus, and as linearly mapping pixels in that region (which can be thought of as a "shadow" of the slice)—including those of the difference array (and reference array) that fall within that "shadow"—so that they match the dimensions of the slice in its actual volumetric plane.

In the illustrated embodiment, the forward-projection and back-projection operations (depicted in steps 40a–40j and 44a–44i, respectively), if not the entire volumetric reconstruction (depicted in steps 40–46) are executed using a GPU (or GPUs) of the type referred to above. These perform the linear mappings that are the basis of the warp1( ) and warp2( ) functions as first-order warps, which can be executed rapidly and with minimal code.

To accommodate the limited floating point precision of the GPUs currently available in the marketplace, the illustrated embodiment capitalizes on another aspect of their native architectures to attain the necessary precision for certain addition operations. Those architectures assume that many operands have four components, namely, three RGB color values and one intensity value, which are processed in parallel. Unfortunately, the precision of each component is typically limited to n bits, where n is typically 24 bits, or less.

For addition operations requiring greater than n bits of accuracy, the illustrated embodiment uses two (or more) of these limited precision components to represents the lower- and higher-order bits of the operands' mantissas. Thus, for example, for additions requiring 32-bit accuracy, the low-order 16-bits of the mantissas of each operand can be retained and processed stored in one of the components (say, the Red component), while the most significant 16-bits are retained and processed via another of the components (say, the Green component). Of course, a different bit-wise dividing point can be used. Following the GPU's execution of an add instruction on such operands, the lower-order component of the instruction's target is tested for overrun and the high-order component incremented with a carry, as necessary. In other embodiments, a similar use of multi-part mantissas is used in connection with other arithmetic operations, such as subtract, complement, and so forth. Regardless, prior to executing a multiply, or other instruction, these multi-component mantissas are recombined into a single component, with the attendant loss in accuracy.

Following execution of the volumetric reconstruction and, particularly, forward- and back-projections detailed above, the digital data processor outputs the estimated volume matrix, e.g., for display on device 28, or for further processing by other apparatus and methods required for the attendant application.

Described herein are methods and apparatus achieving the objects set forth above. It will be appreciated that the illustrated embodiment is merely an example of the invention and that other embodiments incorporating changes therein fall within the scope of the invention. For example, it will be appreciated that the forward-projection and/or back-projection operations detailed herein have application in reconstructions performed using techniques other than MLEM, whether iterative or otherwise, and that they have application outside the field of medical imaging. It will also be appreciated that these forward-projection and back-projection operations have application in imaging objects other than the breast. Further, it will be appreciated that the invention covers forward-projection and back-projection operations incorporating mapping and other variations from those detailed above. In view of these and other modifications,

The invention claimed is:

1. In reconstruction imaging in which a volume is reconstructed from a series of measured projection images, each generated by projection of a radiation source positioned at a respective focus through the volume to a detector at which the respective measured projection image is acquired ("detector plane"), an improved method of back-projecting a two-dimensional (2D) representation ("first 2D representation") to a generate three-dimensional (3D) representation, where the first 2D representation is in the detector plane, the improvement comprising for each of one or more slices of the 3D representation parallel to the detector plane and for each distinct focus at which a said measured projection images is generated, performing the steps of:
i) warping the first 2D representation to generate a second 2D representation, wherein the first 2D representation is formed from intensity differences between the said measured projection images and a projection of an estimate of the volume, the warping step including applying to the first 2D representation a selected linear mapping, where that selected linear mapping would map, in order to match dimensions of the respective slice within the 3D representation, a region defined by projection, at the respective focus, of corners of that slice onto the detector plane,
ii) incrementing values of each of one or more voxels of the respective slice by an amount that is a function of a value of a correspondingly indexed pixel of the second 2D representation.

2. In the reconstruction imaging of claim 1, the further improvement comprising forward-projecting the three-dimensional (3D) representation ("first 3D representation") to generate a two-dimensional (2D) hypothetical projection image, the forward-projecting step comprising for each distinct x-ray source focus at which a respective measured projection image is generated and for each of one or more respective slices in the first 3D representation parallel to the detector plane, performing the steps of
i) warping the respective slice of the first 3D representation to generate a respective slice of a second 3D representation, the warping step including applying to the respective slice of the first 3D representation a selected linear mapping, where that selected linear mapping would map a region defined by projection of corners of the respective measured projection image onto the respective slice of the first 3D representation for the respective x-ray source focus to match dimensions of the respective measured projection image in the detector plane,
ii) incrementing values of each of one or more pixels of the 2D representation by an amount that is a function of a value of a correspondingly indexed pixel of the respective slice of the second 3D representation.

3. In the reconstruction imaging of claim 1, the further improvement comprising executing at least the warping step on a graphics processing unit (GPU) coprocessor.

4. In the reconstruction imaging of claim 3, the further improvement wherein the GPU is of the type having a programmable pixel shader and a programmable vertex shader.

5. In the reconstruction imaging of claim 3, wherein the GPU has one or more instructions that provide for parallel processing of multi-component operands, the further improvement comprising executing such an instruction with a lower-order portion of a mantissa in one component of an operand and a higher-order portion of that mantissa in another component of that same operand.

6. In the reconstruction imaging of claim 5, the further improvement wherein the instruction is an add instruction.

7. In reconstruction imaging in which a volume is reconstructed from one or more projection images, each generated by projection of a radiation source positioned at a respective focus through the volume to a plane at which the respective projection image is acquired ("detector plane"), an improved method of forward-projecting a three-dimensional (3D) representation ("first 3D representation") to generate a two-dimensional (2D) representation, where the 2D representation is in the detector plane, the improvement comprising for each distinct focus at which a said projection image is generated and for each of one or more slices in the first 3D representation parallel to the detector plane, performing the steps of
i) warping the respective slice of the first 3D representation to generate a respective slice of the first 3D representation to generate a respective slice of second 3D representation, wherein the first 3D representation is formed from intensity differences between the said measured projection images and a projection of an estimate of the volume, the warping step including applying to the respective slice of the first 3D representation a selected linear mapping, where that selected linear mapping would map a region defined by projection of corners of the respective projection image onto the respective slice for the respective focus to match dimensions of the projection image in the detector plane,
ii) incrementing values of each of one or more pixels of the 2D representation by an amount that is a function of a value of correspondingly indexed pixels of the respective slice of the second 3D representation.

8. In the reconstruction imaging of claim 7, the further improvement comprising executing at least the warping step on a graphics processing unit (GPU) coprocessor.

9. In the reconstruction imaging of claim 8, the further improvement wherein the GPU is of the type having a programmable pixel shader and a programmable vertex shader.

10. In the reconstruction imaging of claim 9 wherein the GPU has one or more instructions that provide for parallel processing of multi-component operands, the further improvement comprising executing such an instruction with a lower-order portion of a mantissa in one component of an operand and a higher-order portion of that mantissa in another component of that same operand, thereby allowing one or more operations to be performed at higher precision than the underlying computational hardware was otherwise capable of.

11. In the reconstruction imaging of claim 10, the further improvement wherein the instruction is an add instruction.

12. In a method of medical imaging in which a volume is reconstructed from a series of projection images, each generated by projection of a radiation source positioned at a respective focus through the volume to a detector plane at which the respective projection is acquired ("detector plane"), the improvement comprising the steps of:
A. for each focus, forward-projecting a three-dimensional (3D) representation ("first 3D representation"that is an estimate of the volume) to generate a two-dimensional (2D) representation ("first 2D representation") that is an estimate of the projection acquired with the source positioned at that respective focus, the forward-projecting step including warping one or more slices of the first 3D representation to generate corresponding slices of a second 3D representation by mapping voxels of the respective slice of the first 3D representation to voxels of the corresponding slice of the second 3D representation as if rays from the source, when positioned at the respective focus, projected through the volume at a substantially constant angle normal to the detector plane of the respective projection, where the 2D representation is in the detector plane and where the slices of the first and second 3D representation are parallel to the detector plane, B. for each of the selected focus, back-projecting a 2D representation ("second 2D representation") that is a function of the first 2D representation and a respective projection to generate a third 3D representation, the back-projecting step including warping the second 2D representation to generate a third 2D representation by mapping pixels of the second 2D representation to pixels of the third 2D representation as if rays from the source, when positioned at the respective focus, projected through the volume at a substantially constant angle normal to the detector plane of the respective projection, where the second and third 2D representations are in the detector plane.

13. In the method of claim 12, the further improvement wherein the method is an iterative reconstruction method.

14. In the method of claim 13, the further improvement wherein the method as a maximum likelihood estimation maximization method.

15. In the method of claim 14, the further improvement wherein the second 2D representation is a difference between the first 2D representation and the respective projection, 16. In the method of claim 14, the further improvement comprising modifying values of the first 3D representation as a function of the third 3D representation.

17. In the method of claim 12, the further improvement wherein the warping step of the forward-projecting step includes applying to the respective slice of the first 3D representation a selected linear mapping, where that selected linear mapping would map a region defined by projection of corners of the respective projection onto the respective slice for the respective focus to match dimensions of the projection in the detector plane.

18. In the method of claim 17, the further improvement wherein the forward-projecting step includes incrementing values of each of one or more pixels of the first 2D representation by an amount that is a function of a value of a correspondingly indexed pixel of one or more respective selected slices of the second 3D representation.

19. In the method of claim 12, the further improvement wherein the warping step of the back-projecting step includes applying to the applying to the second 2D representation a selected linear mapping, where that selected linear mapping would map a region defined by projection of corners of the respective slice of the third 3D representation onto the detector plane for the respective focus to match dimensions of the respective slice within the third 3D representation.

20. In the method of claim 19, the further improvement wherein the back-projecting step includes incrementing values of each of one or more voxels of each of at least selected slices of the third 3D representation by an amount that is a function of a value of a correspondingly indexed pixel of the second 2D representation.

21. In the method of claim 12, the further improvement comprising executing at least the warping steps on a graphics processing unit (GPU) coprocessor.

22. In the method of claim 21, the further improvement wherein the GPU is of the type having a programmable pixel shader and a programmable vertex shader.

23. In the method of claim 21, wherein the GPU has one or more instructions that provide for parallel processing of multi-component operands, the further improvement comprising executing such an instruction with a lower-order portion of a mantissa in one component of an operand and a higher-order portion of that mantissa in another component of that same operand.

24. In the method of claim 23, the further improvement wherein the instruction is an add instruction.

25. In the reconstruction imaging of claim 1, in which the volume is reconstructed from a series of measured projection images, each generated by projection of the radiation source positioned at a respective focus through the volume to a fixed detector at which the respective measured projection image is acquired ("fixed detector plane"), an improved method of back-projecting a two-dimensional (2D) representation ("first 2D representation") to a generate three-dimensional (3D) representation, where the first 2D representation is in the fixed detector plane, the further improvement comprising for each of one or more slices of the 3D representation parallel to the fixed detector plane and for each distinct focus at which a said measured projection images is generated, performing the steps of:

i) warping the first 2D representation to generate a second 2D representation, the warping step including applying to the first 2D representation a selected linear mapping, where that selected linear mapping would map, in order to match dimensions of the respective slice within the 3D representation, a region defined by projection, at the respective focus, of corners of that slice onto the fixed detector plane.

* * * * *